US008201155B2

(12) United States Patent  
Aharoni et al.

(10) Patent No.: US 8,201,155 B2  
(45) Date of Patent: Jun. 12, 2012

(54) HANDLING MULTIPLE DEFINITION OF TYPES (75) Inventors: Avner Y. Aharoni, Seattle, WA (US); Samuel Y. Ng, Bellevue, WA (US); Michael Shneerson, Redmond, WA (US); Edward T. Maurer, Bellevue, WA (US); Raja Krishnaswamy, Redmond, WA (US); Kevin Halverson, Seattle, WA (US); Timothy Y. Ng, Bellevue, WA (US); Aleksey V. Tsingauz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 12/351,514

(22) Filed: Jan. 9, 2009

(65) Prior Publication Data

US 2010/0180264 A1 Jul. 15, 2010

(51) Int. Cl.
*G06F 9/45* (2006.01)
(52) U.S. Cl. .......................... 717/140; 707/821; 717/147
(58) Field of Classification Search .................... 717/140
See application file for complete search history.

(56) References Cited

U.S. PATENT DOCUMENTS

| 5,754,845 | A | * | 5/1998 | White ........................... 717/147 |
| 6,085,035 | A | * | 7/2000 | Ungar ........................... 717/116 |
| 7,039,908 | B2 | | 5/2006 | Steensgaard |
| 7,150,010 | B1 | | 12/2006 | Ringseth et al. |
| 7,526,773 | B2 | * | 4/2009 | Medvedev ..................... 719/318 |
| 7,802,184 | B1 | * | 9/2010 | Battilana ....................... 715/257 |
| 7,844,958 | B2 | * | 11/2010 | Colton et al. ................. 717/146 |
| 7,945,544 | B2 | * | 5/2011 | Farber et al. .................. 707/698 |
| 2005/0044542 | A1 | | 2/2005 | Grimaud et al. |
| 2006/0048095 | A1 | | 3/2006 | Meijer et al. |
| 2007/0050380 | A1 | | 3/2007 | Meijer et al. |

OTHER PUBLICATIONS

Pierce et al., "Local Type Inference", ACM Transactions on Programming Languages and Systems, vol. 22, No. 1, Jan. 2000, pp. 1-44, http://www.cis.upenn.edu/~bcpierce/papers/lti-toplas.pdf.
Siek et al., "Gradual Typing with Unification-based Inference", 2008, http://ecc-www.colorado.edu/~siek/dls08igtlc.pdf.
Jones et al., "Wobbly Types: Type Inference for Generalised Algebraic Data Types",Technical Report MS-CIS-05-26, Computer and Information Science Department, University of Pennsylvania, Jul. 2004, http://research.microsoft.com/~simonpj/papers/gadt/MS-CIS-05-26.pdf.

(Continued)

*Primary Examiner* — Sathyanarayan Pannala
*Assistant Examiner* — Mohammad Kabir
(74) *Attorney, Agent, or Firm* — Microsoft Corporation (57) ABSTRACT

User assemblies can be created by a compiler that can handle more than one type definition during execution. Local copies are created for respective authoritative types in a code library, and the local copies are marked with a local type identifier. An authoritative type identifier (e.g., a globally unique identifier (GUID)) is copied from the authoritative type to the local type, and functions and properties associated with the local type are also copied from the authoritative type. Authoritative types are resolved for requested types when a local assembly references a local type from a compiled user assembly. The local type can be identified by a local type identifier, and an authoritative type can be retrieved from the code library that has a same authoritative type identifier as the requested type. A local copy of the retrieved authoritative type can be copied to the local assembly under compilation. The compiler can then emit user assemblies that comprise merely local types.

20 Claims, 6 Drawing Sheets

OTHER PUBLICATIONS

Mycroft et al., "Comparing Type-Based and Proof-Directed Decompilation", http://citeseerx.ist.psu.edu/viewdoc/download;jsessionid=4D875651561C590FE561DE03912F58F8?doi=10.1.1.57.6927&rep=rep1&type=pdf.

Shao et al, "A Type-Based Compiler for Standard ML", Princeton-CS-TR-487-95, Mar. 28, 1995, http://flint.cs.yale.edu/flint/publications/tcps.pdf.

* cited by examiner

HANDLING MULTIPLE DEFINITION OF TYPES

BACKGROUND

In a computing environment, managed code can be developed to be executed in a host application, for example, as a macro that is designed to perform a specified operation in the host application. Managed code can comprise one or more assemblies that can be compiled by a compiler then sent to a runtime environment for execution.

Managed code comprises data types that can identify properties and functions associated to the data types. Typically, when computer code is compiled the compiler uses primary definitions of types to compile the assemblies for execution. During execution, the assembly that comprises the primary definitions of types is also sent to the runtime environment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

When deploying managed code, for example, developed by a user for execution in a host environment, a code library (e.g., an interoperability assembly (IA)) is typically needed to be on the computer targeted for deployment, along with the compiled managed code. One can mitigate a need to have the code library on the target machine by having the compiler emit types locally into user assemblies created during compile-time, removing a reference to the code library. However, creating local types can create multiple definitions for a type.

Often, computer languages allow merely one type definition for processing by the compiler, creating a requirement to have the code library deployed on the target machine with the user assemblies. Having multiple definitions for a same type, as respective assemblies create a local type for the code library types during compile-time, violate the "uniqueness of type" constraint for compilers of certain languages.

As provided herein, techniques and systems for creating user assemblies during compile-time that can comprise local types having more than one definition of a type found in the code library. In one embodiment, local copies (local types) of authoritative data types from a code library can be for local assemblies of managed code being compiled. Creating local copies can comprise marking respective local types with a local type identifier, copying an authoritative type identifier (e.g., a globally unique identifier (GUID)) from the authoritative type to the local type, and copying the properties and functions that are used in the local assembly from the authoritative type to the local type.

Further, in this embodiment, if a local assembly has a reference to a type from a user assembly that has already been compiled, a corresponding authoritative type can be resolved for the requested type. Resolving the type can comprise determining if the requested type is a local type by determining if it has a local type identifier. If it does have a local type identifier, for example, the compiler can retrieve a local copy of the authoritative type, from the code library, that has a same authoritative type identifier as the requested type. Additionally, a local copy for the retrieved authoritative type can be created in the local assembly. Finally, the compiler can emit one or more user assemblies comprising merely local copies of one or more respective authoritative data types.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
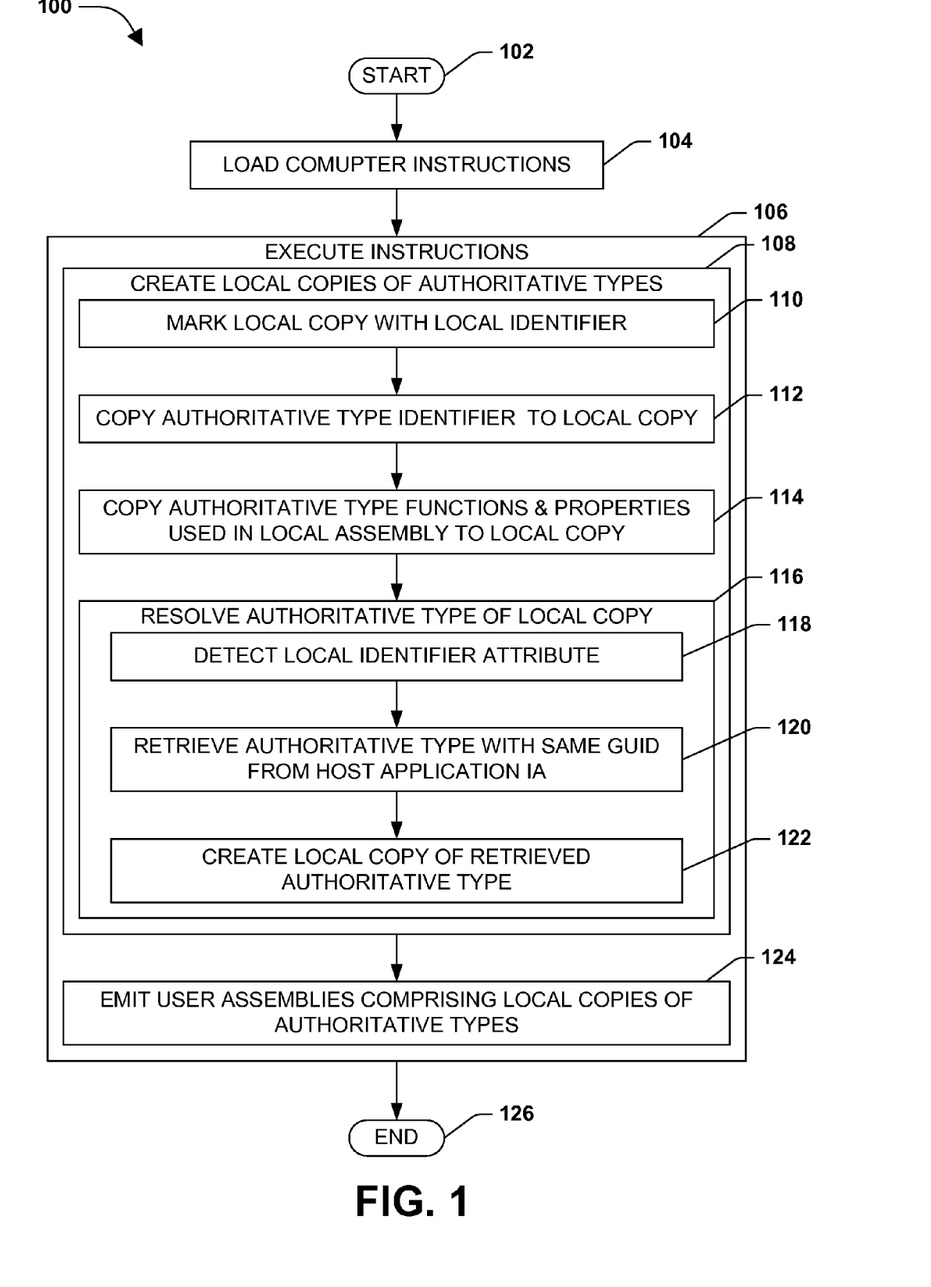
FIG. 1 is a flow chart diagram of an exemplary method for handling more than one definition of a same data type, during compilation of managed code for a host application.

FIG. 1 is a flow diagram illustrating an exemplary method 100 whereby more than one definition of a date type can be handled during compilation of managed code that has been developed for use in a host application. For example, if multiple definitions of a same type are discovered during compile-time, as respective assemblies may have local types for code library authoritative types, it can violate a "uniqueness of type" constraint that is part of typical compilers. In one embodiment, using the exemplary method 100, a compiler can handle multiple definitions of a same type, creating user assemblies that can be executed, for example, without the code library (e.g., an interop assembly).

The exemplary method 100 begins at 102 and involves loading a set of computer-usable instructions onto a computer system's memory, at 104, and executing the instructions at 106. When the set of computer-usable instructions are executed they cause the compiler to create local copies of authoritative data types from a code library, such as an interop assembly, for respective local assemblies of managed code being compiled, at 108. For example, in one embodiment, the authoritative data type may be a primary definition of a data type used at compile time by the compiler, which are found in the code library for the code being compiled. In another embodiment, the code library may be a primary interoperability assembly (PIA) that is used for compilation of the managed code in an application development and execution framework.

Further, in one embodiment, the local copy may be a copy of an authoritative data type, such as is found in the code library, copied to a local assembly, where the local copy is merely a data type definition for the local assembly. Further, in this embodiment, the local copy (local type) in a user assembly may be referenced from local assemblies that are being compile. In another embodiment, data types may be Component Object Model (COM) interface objects, for example. In this embodiment, COM interfaces can be protocol declarations that are without an implementation, for example, merely describing properties and functions (e.g., "I am an operation", "count integers").

In the exemplary method 100, at 110, creating local copies of authoritative data types comprises marking the local copy with a local identifier attribute. For example, a special identification can be added to the local copy that identifies it as a local type, distinguishing it from the authoritative type from which it was copied. In one embodiment, marking the local copy with a local identifier attribute can comprise adding a piece of metadata that identifies a local copy of an authoritative data type. In another embodiment, a piece of metadata may be added to the local copy that identifies it as a local type of a particular authoritative type.

At 112, creating local copies of authoritative data types further comprises copying an authoritative type identifier (e.g., a globally unique identifier (GUID)) from the authoritative data type to the local copy. For example, authoritative data types in a code library respectively comprise an authoritative type identifier, which may provide a reference number that is typically unique in this context. Authoritative type identifiers can be used to identify particular authoritative data types and corresponding local copies, where the authoritative type identifier has been copied to the local copy from the authoritative type.

At 114, creating local copies of authoritative data types further comprises copying merely functions and properties of the authoritative data type, which are used by the local assembly being compiled from the authoritative data type to the local copy. As described above, authoritative types can merely be interfaces that comprise declarations of properties and functions. In one embodiment, respective properties and functions for an authoritative type describe where and how that type may be used in assemblies using the associated code library during compile-time. However, a local assembly may utilize merely some of the respective properties and functions associated with the authoritative data type.

In this embodiment, for example, usage information can be collected by the compiler that identifies which functions and properties of the authoritative type are used in the local assembly under compilation. In this example, when a local copy of an authoritative type is retrieved from the code library, merely those properties and functions that have been identified in the usage information can be copied to the local copy of the authoritative data type.

In the exemplary method 100, at 116, creating local copies of authoritative data types further comprises resolving an authoritative data type for a requested data type if a local assembly requests a data type from a compiled user assembly. For example, compilation of a managed code project may be separated into several projects comprising local assemblies to be compiled. In this example, a first local assembly that is being compiled may reference a type from a second local assembly that has already been compiled (user assembly). The compiler would have already created local copies of authoritative data types for the user assembly, therefore, in this example, the first local assembly may be requesting a data type from the user assembly that is a local copy (e.g., merely comprising a identifier, a GUID, and properties and functions associated with the user assembly).

At 118, resolving an authoritative data type comprises determining if a local copy of an authoritative data type is requested from the compiled user assembly by detecting the local identifier attribute. As described above, when a local copy of an authoritative type is created the compiler can add a local identifier attribute to the local copy, for example, to distinguish it from the authoritative type. In one embodiment, when a data type is requested from a compiled user assembly, the compiler can determine whether the requested type comprises a local identifier attribute, such as a piece of metadata. In this way, for example, the requested data type can be identified as a local copy, as distinguished from the corresponding authoritative type.

At 120, if it is determined (e.g., by the compiler) that a local copy of an authoritative data type is requested from the compiled user assembly, resolving an authoritative data type further comprises retrieving an authoritative data type with a same authoritative type identifier as the requested local data type from the code library. For example, during compilation of the user assembly (e.g., the assembly that a local assembly currently under compilation is requesting a data type from), an authoritative type identifier associated with an authoritative type was copied to the local copy of the authoritative type in the user assembly. In one embodiment, the compiler can use the authoritative type identifier from the local type that has been requested by the local assembly under compilation to identify and retrieve a corresponding authoritative type found in the code library.

In another embodiment, in order to resolve an authoritative data type for a requested data type, if a local assembly requests a data type from a compiled user assembly, the compiler can identify the corresponding authoritative type by reflecting on the code library. In this way, for example, the compiler can reflect the authoritative type identifier from the requested data type on the code library to find an authoritative type with the same authoritative type identifier.

In another embodiment, retrieving an authoritative data type with a same authoritative type identifier as the requested local data type from the code library can comprise determining whether the authoritative data type with a same authoritative type identifier as the requested local data type is even present in the code library. In this embodiment, if the authoritative data type with a same authoritative type identifier as the requested local data type is not present in the code library, the compiler can throw a compilation error, for example, notifying the user that the requested type is not available.

At 122, resolving an authoritative data type further comprises creating a local copy of the authoritative data type, retrieved from the code library, with a same authoritative type identifier as the local data type requested from the user assembly. For example, the compiler can create a local copy of the authoritative type identified with the same authoritative type identifier in a user assembly for the local assembly under compilation.

In one embodiment, creating a local copy of the retrieved authoritative data type with a same authoritative type identifier as the requested local data type from the local assembly can comprise copying the authoritative data type with a same authoritative type identifier as the requested local data type from the code library to the local assembly. Thereby creating a local copy of the authoritative type in the local assembly.

Further, in this embodiment, creating a local copy of the retrieved authoritative data type comprises marking the local copy in the local assembly with a local identifier attribute, as described above.

Additionally, in this embodiment, creating a local copy of the retrieved authoritative data type comprises copying the authoritative type identifier from the identified authoritative data type to the local copy in the local assembly. In this way, the local type that corresponds to the authoritative type copied from the code library, which corresponds to the data type requested from a compiled user assembly, can have a same authoritative type identifier as the authoritative type.

Also, in this embodiment, creating a local copy of the retrieved authoritative data type comprises copying merely functions and properties that call the authoritative data type in the local assembly from the authoritative data type to the local copy in the local assembly. For example, the local assembly under compilation may use the authoritative type in some properties and functions that are different than the compiled user assembly that was subjected to the type request. In this example, merely those properties and functions associated with the current local assembly under compilation are copied from the authoritative type to the local type, which may be different than both the authoritative type and the type called from the user assembly.

Having created local types of authoritative types in one or more compiled user assemblies, respective user assemblies that comprise merely local copies of one or more respective authoritative data types can be emitted, at 124 in the exemplary method 100. For example, in one embodiment, the compiler may compile a managed code project, that comprises one or more local assembly projects, into one or more user assemblies. In this example, user assemblies may be used to execute the managed code in a runtime environment.

Having emitted one or more user assemblies, the exemplary method 100 ends at 126.

In one aspect, local assemblies compiled by a compiler, for example, may merely utilize the authoritative types in a portion of the properties and functions that have been assigned to the authoritative type in a code library, such as an interoperability assembly. In this aspect, an authoritative type's properties and functions that have not been utilized by local types may comprise code library gaps.

In one embodiment, the exemplary method 100, described above may comprise creating a special gap type for respective authoritative data types. In this embodiment, the special gap type can comprise properties and methods that are available for the authoritative data type in the code library, but which have not been used for the authoritative data type in the respective local assemblies. For example, an authoritative type may comprise a property and several functions for which it can be used in an assembly. In this example, two local assemblies may use all but two of the functions associated with the authority. In this embodiment, for example, a special gap type may be created by the compiler that comprises the two function not utilized by the local assemblies.

In another embodiment, the special gap types can be compiled so that they are recognizable by elements of a runtime environment. For example, a runtime environment may comprise a just-in-time execution service (JIT) that is configured to compile intermediate language to machine code and execute it during execution of the code. In this example, the special gap types are compiled so that the JIT recognizes them so that an exception is not thrown during JIT execution.

Figure 2:
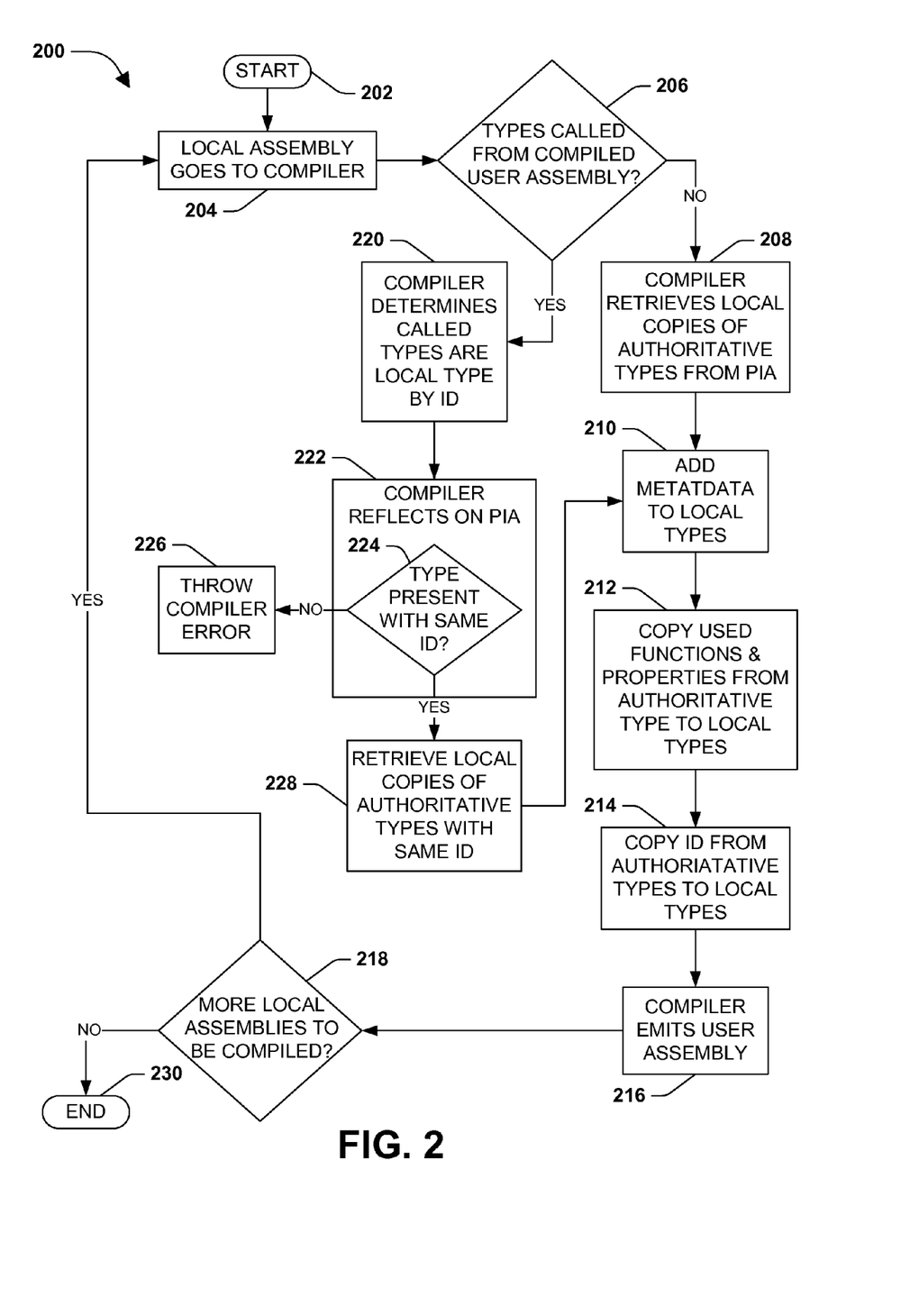
FIG. 2 is a flow diagram illustrating an exemplary embodiment of handling multiple definitions of types during compile-time.

FIG. 2 is a flow diagram illustrating one exemplary embodiment 200 of how a compiler may handle multiple definitions of types during compile-time. The exemplary embodiment 200 begins at 202 and involves a local assembly going to the compiler, at 204. The compiler can determine whether the local assembly under compilation is calling for data types from an already compiled user assembly, at 206. If no types from a compiled user assembly are being called, such as for a first local assembly to be compiled for the code, at 208, the compiler can retrieve local copies (local types) of respective authoritative types from a primary interop assembly (PIA).

At 210, the compiler can add metadata to the local types that identifies them as local types, distinguishing them from their corresponding authoritative types. At 212, the compiler can determine usage for the respective local types in the local assembly, and copy merely those properties and functions from the authoritative type to the local type that are using the local type in the local assembly.

At 214, the compiler can copy authoritative type identifiers from the authoritative types to the corresponding local types in the local assembly for respective local types. Then the compiler can emit a compiled user assembly at 216. If no more local assemblies are to be compiled at 218, the exemplary method 100 ends at 230.

However, if another user assembly is to be compiled, it is sent to the compiler at 204. If a local assembly calls for a type from a compiled user assembly, at 206, the compiler can determine whether the called type from the user assembly is a local type by checking for the added metadata that identifies a local type, at 220. If a local type is identified, the compiler can reflect on the PIA, at 222, to determine whether an authoritative type is present in the PIA that has a same authoritative type identifier as the called local type, at 224.

If an authoritative type is not present with a same authoritative type identifier as the called type, the compiler can throw an error, at 226. If an authoritative type with a same authoritative type identifier is identified, a local copy of the identified authoritative type can be copied to the local assembly, at 228. The compiler can then customize the local type, as described above, and emit the second user assembly at 216.

Figure 3:
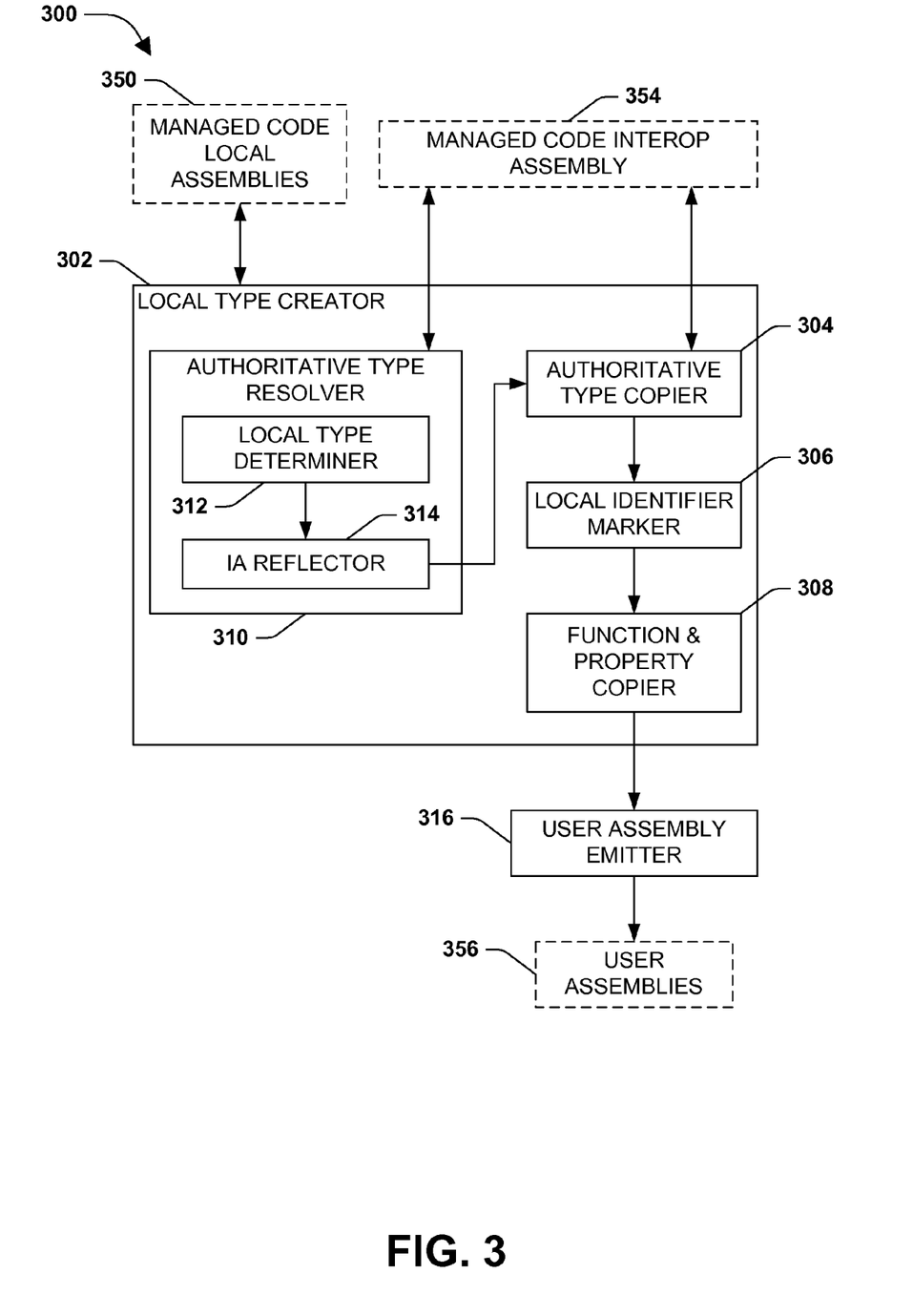
FIG. 3 is a component diagram of an exemplary system for creating user assemblies of managed computer code for a host application that can handle more than one definition of a same data type.

A system may be devised that can create user assemblies comprising merely local types, which may be used, for example, in a runtime environment to execute managed code without a code library. FIG. 3 is a component diagram illustrating an exemplary system 300 for creating user assemblies 356 from managed code 350 for a host application that can handle more than one definition of a same data type.

The exemplary system 300 comprises a local type creation component 302 configured to create local copies of authoritative data types from a code library 354 for respective local assemblies of managed code 350. The local type creation component 302 comprises an authoritative type copying component 304, which is configured to retrieve a local copy of an authoritative type from the code library 354. For example, the authoritative type copying component 304 can copy respective authoritative types from the code library 354 to the local assembly that are utilized by the local assembly.

In one embodiment, the authoritative type copying component 304 can be configured to copy an authoritative type identifier (e.g., a globally unique identifier (GUID)) from the authoritative type to the local copy. For example, respective authoritative types can comprise authoritative type identifiers, and these authoritative type identifiers can be copied to the local copy, thereby identifying the local type as a copy of the authoritative type in the local assembly.

The local type creation component 302 further comprises a local identifier marking component 306 that is configured to mark the local copy with a local identifier attribute. In one embodiment the local identifier attribute can be a piece of metadata that identifies the local type as a local copy of the corresponding authoritative type. In this way, for example, a compiler can distinguish the local type from the authoritative type, which can facilitate handling of multiple type definitions.

The local type creation component 302 further comprises a function and property copying component 308, which is configured to copy, from the authoritative data type to the local copy, merely functions and properties that use the copied authoritative data type in the local assembly. For example, where a type comprises a COM interface that merely declares properties and functions for the type, the function and property copying component 308 can copy those properties and functions used for the type in the local assembly. In this example, those properties and functions not used for the type in the local assembly are not copied from the authoritative type in the code library.

In another embodiment, the authoritative type copying component 304 may be configured to request the local identifier marking component 306 to mark the local copy with a local identifier attribute. Further, in this embodiment, the authoritative type copying component 304 may be configured to request the function and property copying component 308 to copy merely functions and properties that use the copied authoritative data type in the local assembly from the authoritative data type to the local copy.

In the exemplary system 300, the local type creation component 302 further comprises an authoritative type resolving component 310, which can be configured to resolve an authoritative data type for a requested data type if a local assembly 350 requests a data type from a compiled user assembly 356. For example, a local assembly under compilation may comprise a reference to a type found in a user assembly that has already been compiled, and therefore, may comprise local types.

The authoritative type resolving component 310 comprises a local type determination component 312 that is configured to detect a local identifier attribute in the requested data type that identifies it as a local type of the compiled user assembly 356. For example, the local type determination component 312 can detect local types called by the local assembly 350 under compilation. The authoritative type resolving component 310 further comprises a code library reflection component 314 that is configured to identify an authoritative data type in the code library 354 with a same authoritative type identifier as the local type of the compiled user assembly 356 if the requested data type is identified as a local type of the compiled user assembly 356. For example, if the local assembly 350 under compilation requests a local type, the code library reflection component 314 can identify a corresponding authoritative type in the code library 354.

In one embodiment, the authoritative type resolving component 310 comprising a compiler error component that can be configured to throw a compiler error if the authoritative data type with a same authoritative type identifier as the requested local data type is not present in the code library. For example, if the code library reflection component 314 cannot find a corresponding authoritative type in the code library 354, an error can be thrown.

In another embodiment, the authoritative type resolving component 310 can be configured to send a request to the authoritative type copying component 304 to retrieve a local copy of the identified authoritative type from the code library 354 with a same authoritative type identifier as the requested local type of the compiled user assembly 356. In this way, for example, when a local assembly 350 requests a local type from a compiled user assembly 356, a local copy of a corresponding authoritative type can be copied to the local assembly under compilation.

The exemplary system 300 further comprises a user assembly emitting component 316 that is configured to emit respective user assemblies that comprise merely local copies of one or more respective authoritative data types. For example, a compiler can compile one or more local assemblies that comprise the managed code, and create user assemblies having merely local types, which may comprise merely those properties and functions utilized in the user assemblies.

In one embodiment, the exemplary system 300 may comprise a gap-type creation component configured to create a special gap type for respective authoritative data types. In this embodiment, the special gap type may comprise properties and methods found in the authoritative data type, which are not used in the respective local assemblies 350. For example, a local assembly 350 may merely utilize an authoritative type for a portion of the properties and functions that have been assigned to the authoritative type. In this example, the gap-type creation component a special gap type that comprises those properties and functions not used by the local assemblies.

Figure 4:
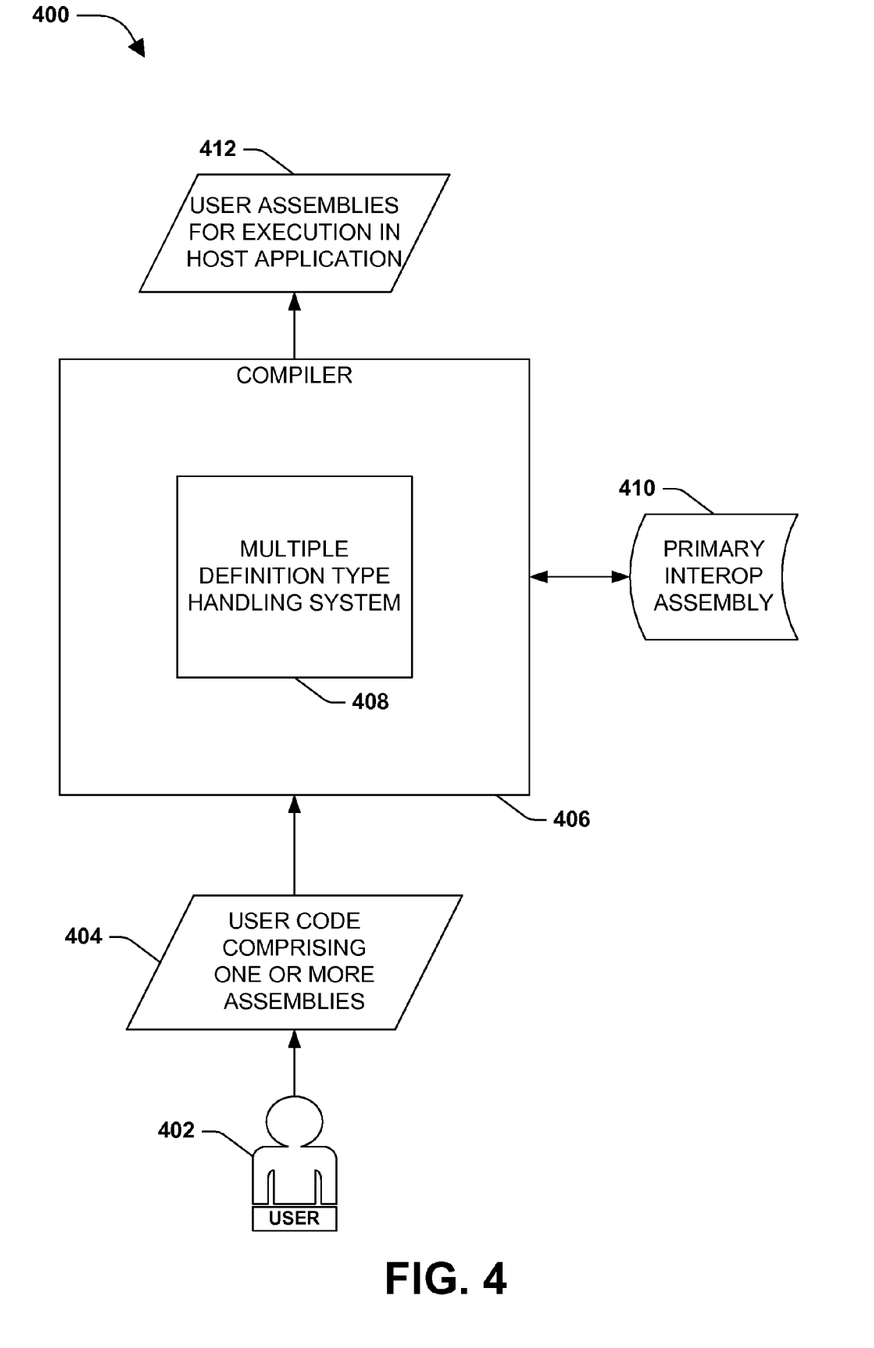
FIG. 4 is a diagram illustrating of an exemplary environment that may implement aspects of the exemplary systems described herein.

FIG. 4 is an illustration of an exemplary environment that may implement the exemplary systems described above. A user 402 may develop managed code 404 that is developed to be executed in a host application (e.g., a macro). The managed code 404 can comprise one or more local assemblies to be sent to a compiler 406.

The compiler 406 may be configured to compile the language of the managed code 404, for example, into user assemblies 412 comprising an intermediate language. The compiled user assemblies 412 may be configured to be executed in a runtime environment, for a host application. The compiler 406 can comprise an implementation of the exemplary system, described herein, for handling multiple definition types 408.

In this exemplary environment 400, the local assemblies 404, along with a primary interop assembly for the managed code, can be sent to the compiler 406. The compiler 406 can implement the multiple definition type handling system 408 to create user assemblies 412. The user assemblies can then be sent to a runtime environment to be executed, for example, without needing the primary interop assembly 410 for the managed code.

Figure 5:
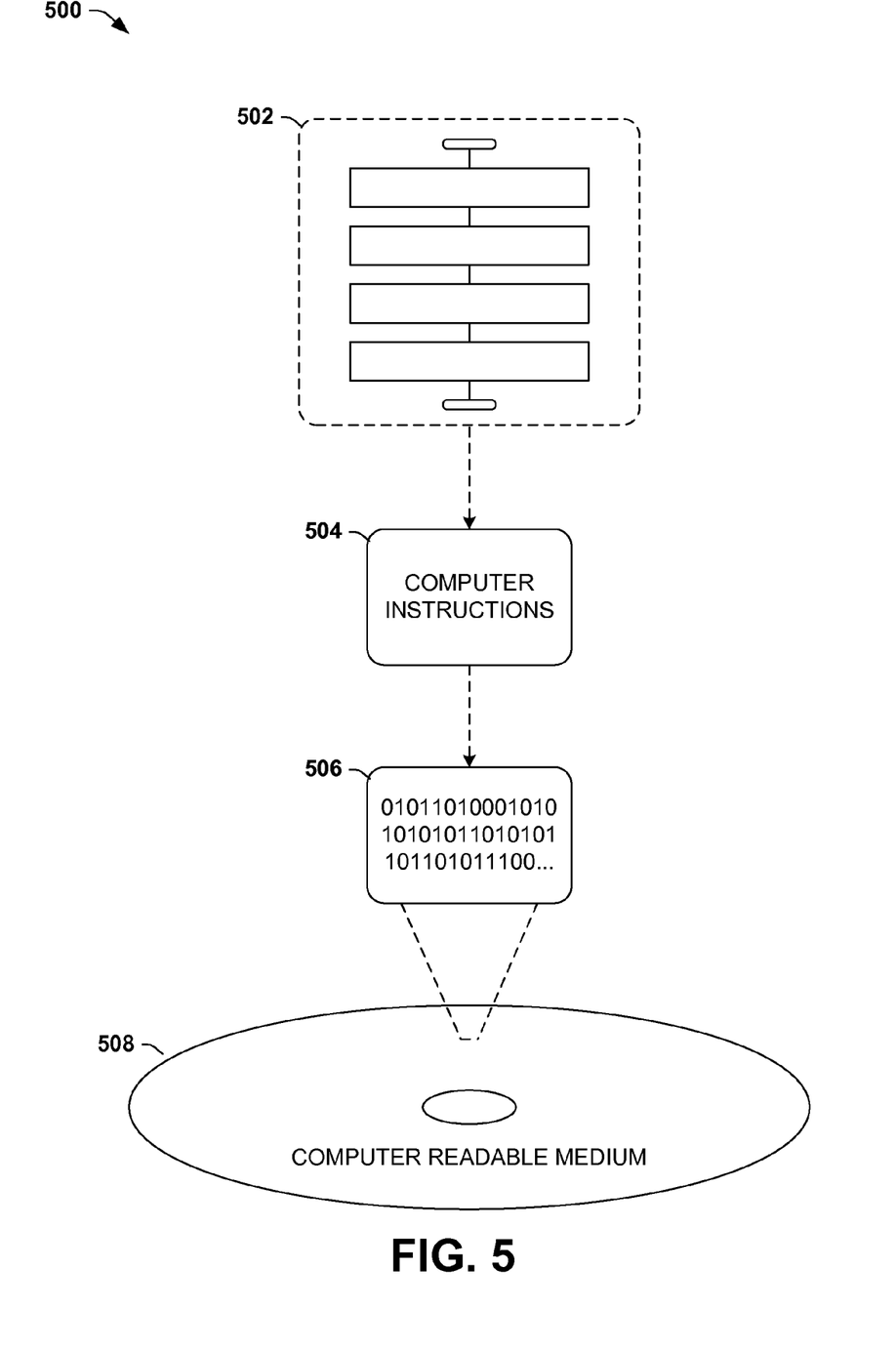
FIG. 5 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 508 (e.g., a CD-R, DVD-R, or a platter of a hard disk drive), on which is encoded computer-readable data 506. This computer-readable data 506 in turn comprises a set of computer instructions 504 configured to operate according to one or more of the principles set forth herein. In one such embodiment 502, the processor-executable instructions 504 may be configured to perform a method, such as the exemplary method 100 of FIG. 1, for example. In another such embodiment, the processor-executable instructions 504 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
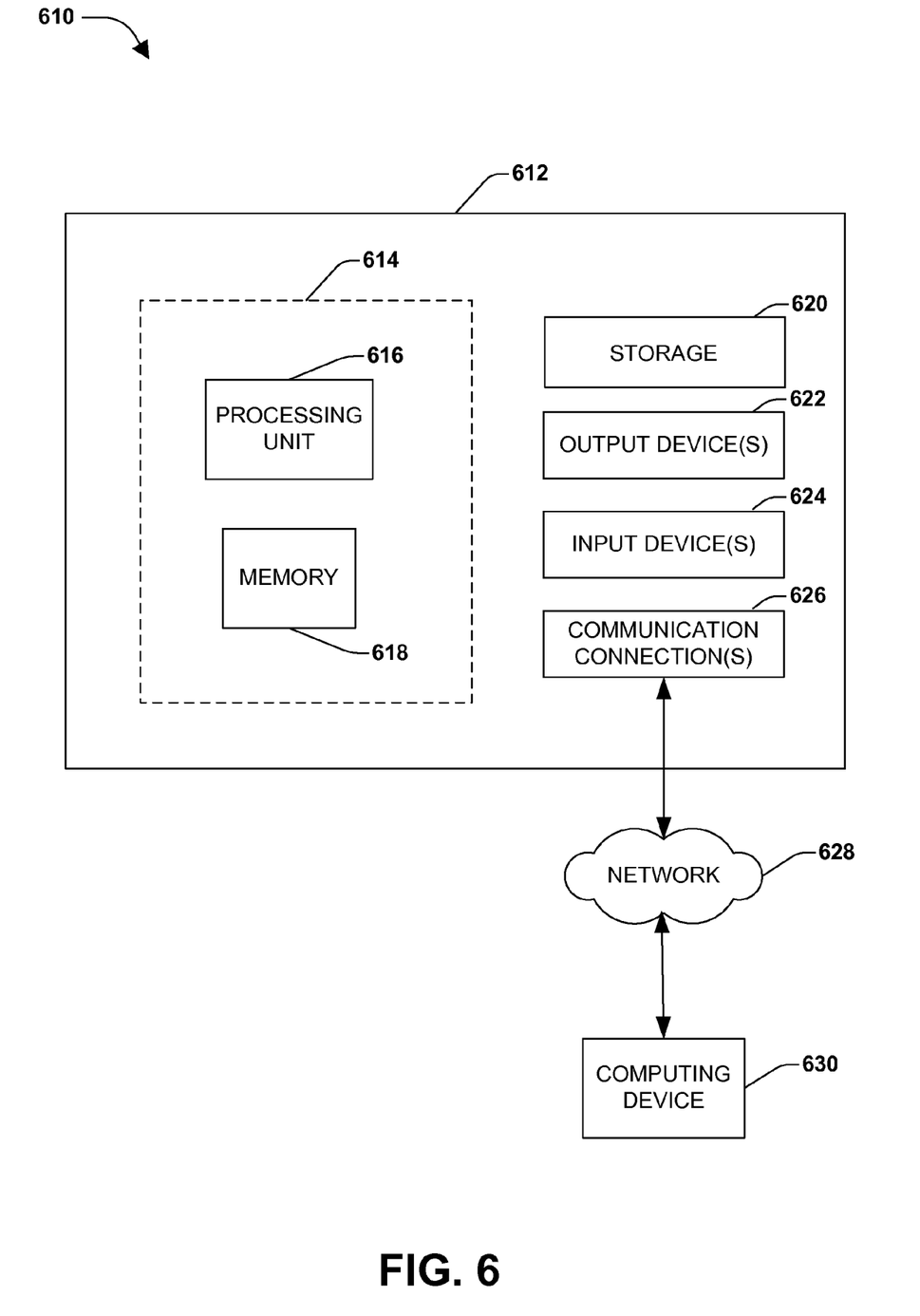
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for handling more than one definition of a same data type, during compilation of managed code for a host application, comprising:
    loading a set of computer-usable instructions onto a memory of a computer system, which when executed cause a compiler on the computer system to:
        create one or more local copies of one or more authoritative data types from a code library for respective local assemblies of managed code being compiled, comprising:
            marking a local copy with a local identifier attribute;
            copying an authoritative type identifier from an authoritative data type to the local copy;
            copying merely functions and properties of the authoritative data type used in a local assembly from the authoritative data type to the local copy; and
            if a second local assembly requests a data type from a compiled user assembly, resolving a second authoritative data type for the requested data type, comprising:
                retrieving the second authoritative data type with a same authoritative type identifier as the requested data type from the code library if a determination is made, by detecting a second local identifier attribute, that a local copy of the second authoritative data type is requested from the compiled user assembly; and
                creating a local copy of the retrieved second authoritative data type; and
        emit one or more user assemblies that respectively comprise merely one or more local copies of one or more authoritative data types; and
    executing the set of computer-usable instructions on the computer system.

2. The method of claim 1, comprising causing the compiler on the computer system to create a special gap type for respective authoritative data types, the special gap type comprising properties and methods available for the respective authoritative data types, which are not used for the authoritative data types in the respective local assemblies.

3. The method of claim 2, the special gap type compiled to be recognizable by a runtime environment.

4. The method of claim 1, the code library comprising a primary interoperability assembly used for compilation of the managed code in an application development and execution framework.

5. The method of claim 1, marking the local copy with the local identifier attribute comprising adding a piece of metadata that identifies the local copy of the authoritative data type.

6. The method of claim 5, the piece of metadata corresponding merely to the authoritative data type copied.

7. The method of claim 1, resolving the second authoritative data type for the requested data type, comprising reflecting on the code library to identify an other authoritative data type that has a same authoritative type identifier as the requested data type.

8. The method of claim 1, retrieving the second authoritative data type with the same authoritative type identifier as the requested data type from the code library comprising:
    determining if the second authoritative data type with the same authoritative type identifier as the requested data type is present in the code library; and
    if the second authoritative data type with the same authoritative type identifier as the requested data type is not present in the code library, throwing an error.

9. The method of claim 1, creating the local copy of the retrieved second authoritative data type comprising:
    copying the second authoritative data type with the same authoritative type identifier as the requested data type from the code library to the local assembly;

marking the copy in the local assembly with an other local identifier attribute;

copying the same authoritative type identifier from the second authoritative data type to the copy in the local assembly; and copying merely functions and properties that call the second authoritative data type in the local assembly from the second authoritative data type to the copy in the local assembly.

10. The method of claim 1, the authoritative data type comprising a primary definition of a data type used at compile time by the compiler.

11. The method of claim 1, the local copy with the local identifier attribute comprising a copy of the authoritative data type used in the local assembly that is merely a data type definition for the local assembly that can be referenced from other assemblies during compile-time.

12. The method of claim 1, the authoritative data types comprising COM interfaces.

13. A system for creating user assemblies from managed code for a host application that can handle more than one definition of a same data type, comprising:

a local type creation component configured to create one or more local copies of one or more authoritative data types from a code library for respective local assemblies of managed code, comprising:

an authoritative type copying component configured to retrieve a local copy of an authoritative data type from the code library;

a local identifier marking component configured to mark the local copy with a local identifier attribute;

a function and property copying component configured to copy merely functions and properties of the authoritative data type used in a local assembly from the authoritative data type to the local copy; and an authoritative type resolving component configured to, if a second local assembly requests a data type from a compiled user assembly, resolve a second authoritative data type for the requested data type, the authoritative type resolving component comprising:

a code library reflection component configured to identify the second authoritative data type in the code library with a same authoritative type identifier as the requested data type if a determination is made, by detecting a second local identifier attribute, that the requested data type is identified as a local type of the compiled user assembly; and a user assembly emitting component configured to emit one or more user assemblies that respectively comprise merely one or more local copies of one or more authoritative data types, the system implemented at least in part via one or more microprocessors configured to execute instructions comprised in memory.

14. The system of claim 13, comprising a gap-type creation component configured to create a special gap type for respective authoritative data types, the special gap type comprising properties and methods available for respective authoritative data types, which are not used for the authoritative data types in the respective local assemblies.

15. The system of claim 13, the authoritative type resolving component comprising a compiler error component configured to throw a compiler error if the second authoritative data type with the same authoritative type identifier as the requested data type is not present in the code library.

16. The system of claim 13, the authoritative type copying component configured to copy an authoritative type identifier from the authoritative data type to the local copy of the authoritative data type.

17. The system of claim 13, the second local identifier attribute comprising a piece of metadata that identifies the local type as a local copy of a corresponding authoritative type.

18. The system of claim 13, the authoritative type resolving component configured to send a request to the authoritative type copying component to retrieve a local copy of the second authoritative data type from the code library with the same authoritative type identifier as the requested data type.

19. The system of claim 18, the authoritative type copying component configured to:

request the local identifier marking component to mark the local copy of the second authoritative data type with the second local identifier attribute.

20. A computer readable medium comprising instructions that when executed via a processing unit perform a method for handling more than one definition of a same data type, during compilation of managed code for a host application, comprising:

causing a compiler to:

create one or more local copies of one or more authoritative data types from a code library for respective local assemblies of managed code being compiled, comprising:

marking a local copy with a local identifier attribute;

copying an authoritative type identifier from an authoritative data type to the local copy;

copying merely functions and properties of the authoritative data type used in a local assembly from the authoritative data type to the local copy; and if a second local assembly requests a data type from a compiled user assembly, resolving a second authoritative data type for the requested data type, comprising:

retrieving the second authoritative data type with a same authoritative type identifier as the requested data type from the code library if a determination is made, by detecting a second local identifier attribute, that a local copy of the second authoritative data type is requested from the compiled user assembly; and creating a local copy of the retrieved second authoritative data type; and emit one or more user assemblies that respectively comprise merely one or more local copies of one or more authoritative data types.

* * * * *